(12) United States Patent
Zhang

(10) Patent No.: US 8,184,778 B2
(45) Date of Patent: May 22, 2012

(54) LINE MEASUREMENT METHOD AND MEASUREMENT APPARATUS

(75) Inventor: Pengrui Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 371 days.

(21) Appl. No.: 12/541,230

(22) Filed: Aug. 14, 2009

(65) Prior Publication Data

US 2009/0296896 A1 Dec. 3, 2009

Related U.S. Application Data

(63) Continuation of application No. PCT/CN2008/072974, filed on Nov. 7, 2008.

(30) Foreign Application Priority Data

Nov. 9, 2007 (CN) .......................... 2007 1 0188123

(51) Int. Cl.
 *H04M 1/24* (2006.01)
 *H04M 3/08* (2006.01)
 *H04M 3/22* (2006.01)

(52) U.S. Cl. ...................... 379/24; 379/1.04; 379/29.09

(58) Field of Classification Search .................. 379/1.03, 379/1.04, 22, 22.08, 23, 24, 27.03, 27.08, 379/28, 29.09, 30; 375/224, 226, 227
See application file for complete search history.

(56) References Cited

U.S. PATENT DOCUMENTS

| | | | | |
|---|---|---|---|---|
| 6,466,647 B1 * | 10/2002 | Tennyson | ...................... | 379/1.04 |
| 6,829,330 B2 * | 12/2004 | Belge et al. | ................. | 379/22.04 |
| 7,388,945 B2 * | 6/2008 | Pythoud | ....................... | 379/1.03 |
| 2001/0043647 A1 * | 11/2001 | Belge | ............................ | 375/222 |
| 2003/0235274 A1 * | 12/2003 | Afzal | ............................ | 379/1.04 |
| 2005/0163287 A1 | 7/2005 | Ouyang et al. | | |
| 2006/0098725 A1 | 5/2006 | Rhee et al. | | |
| 2006/0227940 A1 | 10/2006 | Ferdosi et al. | | |

FOREIGN PATENT DOCUMENTS

| | | |
|---|---|---|
| CN | 1545769 A | 11/2004 |
| CN | 1588966 A | 3/2005 |
| CN | 1663227 A | 8/2005 |

(Continued)

OTHER PUBLICATIONS

International Search Report from P.R. China in International Application No. PCT/CN2008/072974 mailed Feb. 12, 2009.

(Continued)

*Primary Examiner* — Quoc D Tran

(74) *Attorney, Agent, or Firm* — Finnegan, Henderson, Farabow, Garrett & Dunner LLP

(57) ABSTRACT

A line measurement method is provided. The method includes obtaining data of relation between a line length and an insertion loss phase radian, and obtaining data of relation between the line length and a loop attenuation parameter value; obtaining four length values from the data of relation between the line length and the insertion loss phase radian, and defining a length range to obtain the first and the second length range; and determining the boundary of the second length range close to a midpoint of the first length range, using a line length value corresponding to the boundary close to the midpoint as a measured line length, and using a line diameter corresponding to the line length value as a measured line diameter.

8 Claims, 8 Drawing Sheets

FOREIGN PATENT DOCUMENTS

| | | |
|---|---|---|
| CN | 1784586 A | 6/2006 |
| CN | 1873433 A | 12/2006 |
| CN | 101159777 A | 4/2008 |
| EP | 1 701 172 A1 | 9/2006 |
| WO | WO 03/026160 A2 | 3/2003 |

OTHER PUBLICATIONS

Written Opinion of the International Searching Authority, issued by the International Searching Authority (the State Intellectual Property Office of China), dated Feb. 12, 2009, for an International Application No. PCT/CN2008/072974, filed of Nov. 7, 2008, (5 pages).

Telecommunication Standardization Sector of ITU "Series G: Transmission Systems and Media, Digital Systems and Networks Digital sections and digital line system—Access networks, Asymmetric digital subscriber line transceivers 2 (ADSL2)," G.992.3 (Jan. 2005), 436 pages.

Telecommunication Standardization Sector of ITU "Series G: Transmission Systems and Media, Digital Systems and Networks Digital sections and digital line system—Access networks, Asymmetric Digital Subscriber Line (ADSL) transceivers—Extended bandwidth ADSL2 (ADLS2+)," G.992.5 (Jan. 2005), 110 pages.

* cited by examiner

Step 201: Obtain the data of relation between the line length and the insertion loss phase radian of the first-loop gauge under a fixed frequency, and obtain the data of relation between the line length and the loop attenuation parameter value; obtain the data of relation between the line length and the insertion loss phase radian of the second-loop gauge under a fixed frequency, and obtain the data of relation between the line length and the loop attenuation parameter value Step 202: Search the data of relation between the line length and the insertion loss phase radian of the first-diameter line and the second-diameter line according to the insertion loss phase radian of the measured loop gauge to obtain two length values, and define a first length range according to the two length values; search the data of relation between the line length and the loop attenuation parameter value of the first-loop gauge and the second-loop gauge according to the loop attenuation parameter value of the measured loop gauge to obtain two length values, and define a second length range according to the two length values Step 203: Judge which boundary of the second length range is close to the midpoint of the first length range, use a line length value corresponding to the boundary close to the midpoint as a measured line length, and use the line diameter corresponding to the line length value as a measured line diameter

FIG. 2

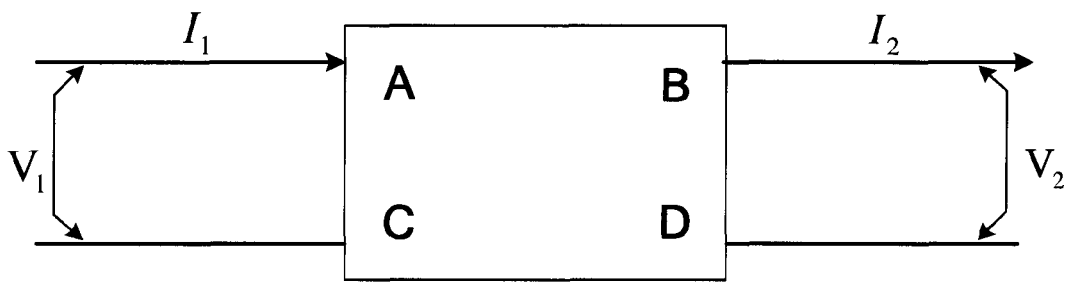

FIG. 3

Step 801: Obtain the data of relation between the line length and the insertion loss phase radian of the first-loop gauge under a fixed frequency, and obtain the data of relation between the line length and the loop attenuation parameter value; obtain the data of relation between the line length and the insertion loss phase radian of the second-loop gauge under a fixed frequency, and obtain the data of relation between the line length and the loop attenuation parameter value Step 802: Search the data of relation between the line length and the insertion loss phase radian of the first-loop gauge and the second-loop gauge according to the insertion loss phase radian of the measured loop gauge to obtain two length values, and define a first length range according to the two length values; search the data of relation between the line length and the loop attenuation parameter value of the first-loop gauge and the second-loop gauge according to the loop attenuation parameter value of the measured loop gauge to obtain two length values, define a second length range and a third length range by using the two length values as midpoints respectively, and define the remaining length range between the second length range and the third length range as a fourth length range, where the second length range and the third length range correspond to the first-loop gauge and the second-loop gauge respectively, and the fourth length range corresponds to a hybrid line composed of the first-loop gauge and the second-loop gauge Step 803: If the midpoint of the first length range belongs to the second or third length range, determine the line diameter corresponding to the second or third length range as the measured line diameter; if the midpoint of the first length range belongs to the fourth length range, determine the hybrid line diameter corresponding to the fourth length range as the measured line diameter

FIG. 8

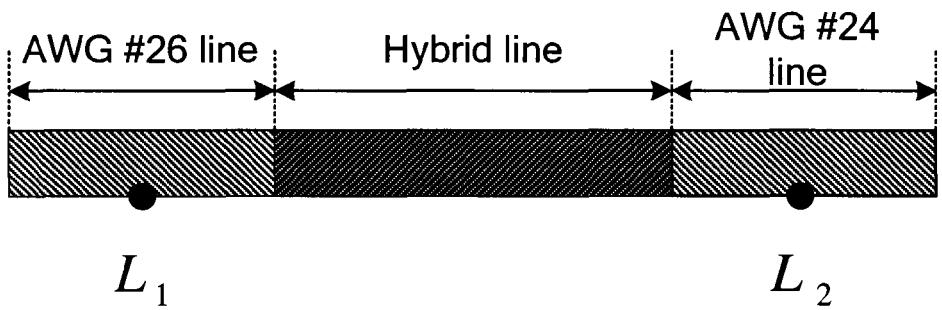

| Step 1001: Obtain the data of relation between the line length and the uplink loop attenuation parameter value of the first-loop gauge, and obtain the data of relation between the line length and the downlink loop attenuation parameter value of the first-loop gauge; obtain the data of relation between the line length and the uplink loop attenuation parameter value of the second-loop gauge, and obtain the data of relation between the line length and the downlink loop attenuation parameter value of the second-loop gauge |

↓

| Step 1002: Obtain the first length value and the second length value respectively from the data of relation between the line length and the uplink loop attenuation parameter value of the first-loop gauge and the second-loop gauge according to the loop attenuation parameter value of the measured loop gauge; and obtain the third length value and the fourth length value respectively from the data of relation between the line length and the downlink loop attenuation parameter value of the first-loop gauge and the second-loop gauge according to the loop attenuation parameter value of the measured loop gauge |

↓

| Step 1003: Obtain an absolute value of difference between the first length value and the third length value, obtain an absolute value of difference between the second length value and the fourth length value, compare the two absolute values, and use the diameter and the length of the line corresponding to the length values with a smaller absolute value of difference as the measured line diameter and the measured length |

FIG. 10

LINE MEASUREMENT METHOD AND MEASUREMENT APPARATUS

This application is a continuation of International Application No. PCT/CN2008/072974, filed on Nov. 7, 2008, which claims priority to Chinese Patent Application No. 200710188123.2, filed with the Chinese Patent Office on Nov. 9, 2007, and entitled "Line Measurement Method and Measurement Apparatus." The entire contents of these applications are hereby incorporated by reference in their entirety.

TECHNICAL FIELD

The present disclosure relates to line measurement technologies, and in particular, to a line measurement method and a measurement apparatus.

BACKGROUND

With the expansion of the Digital Subscriber Line Access Multiplexer (DSLAM) network, it is necessary to select subscriber lines quickly, to locate faults accurately, and to maintain the lines automatically and periodically in the DSLAM network application.

As defined by the ITU-T ADSL2 (G.992.3), Dual-ended Line Testing (DELT) is a technology for testing the state of a line by setting test points at both sides of the line. The DELT technology is applicable to the test of the line diagnosis mode. The test data derived from a DSL test performed through the DELT technology helps a maintenance engineer analyze and find the location of the fault caused by crosstalk, radio frequency interference, or a (bridge) tap to discover the fault source.

DELT may measure the line attenuation directly to obtain the length of the measured line. The methods for obtaining the line length through the DELT technology include attenuation measurement, and frequency/phase measurement. For example, to measure the length of a downstream line, a DSL transceiver at the central office may insert an excitation signal into the line, and the DSL transceiver in the subscriber-end device may measure the frequency response. The line length is then calculated according to the received result of the frequency response. In another example, the line length may be calculated by testing the line attenuation.

The DELT technology for measuring the line length in the related art could be improved upon in the following areas:

(1) If the line diameter is unknown, the simple attenuation and frequency/phase tests do not produce a precisely measured line length.

(2) The test objects are unitary. For example, the related DELT technology provides no method for calculating a line diameter.

SUMMARY

A line measurement method and a measurement apparatus are provided in various embodiments of the present disclosure to measure both the diameter and the length of a line in the DELT test and to improve measurement precision.

A line measurement method is provided in an embodiment of the present disclosure. The method includes:

obtaining data of relation between the line length and the insertion loss phase radian of the first-loop gauge and the second-loop gauge under a fixed frequency, and data of relation between the line length and the loop attenuation parameter value;

defining a first length range according to two length values obtained by searching the data of relation between the line length and the insertion loss phase radian of the first-loop gauge and the second-loop gauge according to the insertion loss phase radian of the measured loop gauge; and defining a second length range according to two length values by searching the data of relation between the line length and the loop attenuation parameter value of the first-loop gauge and the second-loop gauge according to the loop attenuation parameter value of the measured loop gauge; and determining the boundary of the second length range close to the midpoint of the first length range, using a line length value corresponding to the boundary close to the midpoint as a measured line length, and using the line diameter corresponding to the line length value as a measured line diameter.

Another line measurement method is provided in an embodiment of the present disclosure. The method includes:

obtaining data of relation between the line length and the insertion loss phase radian of the first-loop gauge and the second-loop gauge under a fixed frequency, and data of relation between the line length and the loop attenuation parameter value;

defining a first length range according to two length values obtained by searching the data of relation between the line length and the insertion loss phase radian of the first-loop gauge and the second-loop gauge according to the insertion loss phase radian of the measured loop gauge; defining a second length range and a third length range by using two length values obtained by searching the data of relation between the line length and the loop attenuation parameter value of the first-loop gauge and the second-loop gauge according to the loop attenuation parameter value of the measured loop gauge as midpoints respectively, and defining the remaining length range between the second length range and the third length range as a fourth length range. The second length range and the third length range correspond to the first-loop gauge and the second-loop gauge respectively, and the fourth length range corresponds to a hybrid line composed of the first-loop gauge and the second-loop gauge; and when the midpoint of the first length range belongs to the second length range, determining the line diameter corresponding to the second length range to be the first line diameter measured; when the midpoint of the first length range belongs to the third length range, determining the line diameter corresponding to the third length range to be the second line diameter measured; when the midpoint of the first length range belongs to the fourth length range, determining the hybrid line diameter corresponding to the fourth length range to be the measured line diameter.

Another line measurement method is provided in an embodiment of the present disclosure. The method includes:

obtaining data of relation between the line length and the uplink loop attenuation parameter value of the first-loop gauge and the second-loop gauge respectively, and data of relation between the line length and the downlink loop attenuation parameter value of the first-loop gauge and the second-loop gauge respectively;

obtaining the first length value and the second length value respectively from the data of relation between the line length and the uplink loop attenuation parameter value of the first-loop gauge and the second-loop gauge according to the loop attenuation parameter value of the measured loop gauge; and the third length value and the fourth length value respectively from the data of relation between the line length and the downlink loop attenuation parameter value of the first-loop gauge and the second-loop gauge according to the loop attenuation parameter value of the measured loop gauge; and obtaining an absolute value of difference between the first length value and the third length value, and an absolute value of difference between the second length value and the fourth length value, comparing the two absolute values, and using the diameter and the length of the line corresponding to the length values with a smaller absolute value of difference as the measured line diameter and the measured length.

Another line measurement method is provided in an embodiment of the present disclosure. The method includes:

obtaining the insertion loss of a measured line;

substituting the theoretical values of the first insertion loss and the second insertion loss of a loop at a middle distance of the first-loop gauge and the second-loop gauge, as well as the insertion loss of the measured line into a function of the insertion loss and the line length under a fixed frequency to obtain the first optional line length and the second optional line length;

substituting the line diameter value and the length value of the first-loop gauge and the second-loop gauge into the insertion loss function of the first-loop gauge and the second-loop gauge to obtain the first calculated value of insertion loss and the second calculated value of insertion loss; and obtaining a sum of errors between the insertion loss of the measured line and the first calculated value of insertion loss in all or some bands; and a sum of errors between the insertion loss of the measured line and the second calculated value of insertion loss in all or some bands; comparing the two sums of errors, and using the line length and the line diameter corresponding to the data with a smaller sum of errors as the measured line length and the measured line diameter.

A measurement apparatus is provided in an embodiment of the present disclosure. The measurement apparatus includes:

a storing unit, configured to store the data of relation between the line length and the insertion loss phase radian of the first-loop gauge under a fixed frequency, and the data of relation between the line length and the loop attenuation parameter value; and store the data of relation between the line length and the insertion loss phase radian of the second-loop gauge under a fixed frequency, and the data of relation between the line length and the loop attenuation parameter value;

a measuring unit, configured to obtain the insertion loss phase radian and the loop attenuation parameter value of the measured loop gauge;

a searching unit, configured to define a first length range according to the two length values; search the data of relation between the line length and the loop attenuation parameter value of the first-loop gauge and the second-loop gauge according to the loop attenuation parameter value of the measured loop gauge to obtain two length values obtained by searching the data of relation between the line length and the insertion loss phase radian of the first-loop gauge and the second-loop gauge according to the insertion loss phase radian of the measured loop gauge, and define a second length range according to the two length values; and a determining unit, configured to determine the boundary of the second length range close to the midpoint of the first length range, use a line length value corresponding to the boundary close to the midpoint as a measured line length, and use the line diameter corresponding to the line length value as a measured line diameter.

The foregoing embodiments show that the data of relation between the line length and the insertion loss phase radian, and data of relation between the line length and the loop attenuation parameter value of lines with various possible diameters are obtained beforehand. Afterward, the insertion loss phase radian and the loop attenuation parameter value are obtained according to the actual measured line, and the corresponding length values are obtained from the data of relation between the line length and the insertion loss phase radian and the data of relation between the line length and the loop attenuation parameter value of lines with various diameters. Subsequently, the errors of the line lengths of lines with various diameters are compared under specific parameter conditions such as the phase radian and loop attenuation parameter value; the line length and the line diameter with a smaller error are used as the line length and the line diameter of the measured loop gauge. Therefore, both line length and line diameter of the measured line may be confirmed skillfully at the same time, and the measurement precision is improved, which facilitates subsequent line maintenance and troubleshooting.

BRIEF DESCRIPTION OF THE DRAWINGS

FIG. 2 is a flowchart of a measurement method provided in an embodiment of the present disclosure.

FIG. 3 shows a 2-port network in an embodiment of the present disclosure.

FIG. 8 is a flowchart of a line measurement method provided in an embodiment of the present disclosure.

FIG. 9 shows a hybrid line interval in an embodiment of the present disclosure.

FIG. 10 is a flowchart of a line measurement method provided in an embodiment of the present disclosure.

DETAILED DESCRIPTION

One aspect of the present disclosure is a practical technology for calculating the line length and the line diameter by using DELT test data, and is a method for calculating the line length and the line diameter of the subscriber line according to the test parameters defined in the relevant chapters in ADSL 2 (G.992.3) and ADSL2+(G.992.5) formulated by the ITU-T, and provides a reference basis for maintenance and troubleshooting of the subscriber line.

Figure 1:
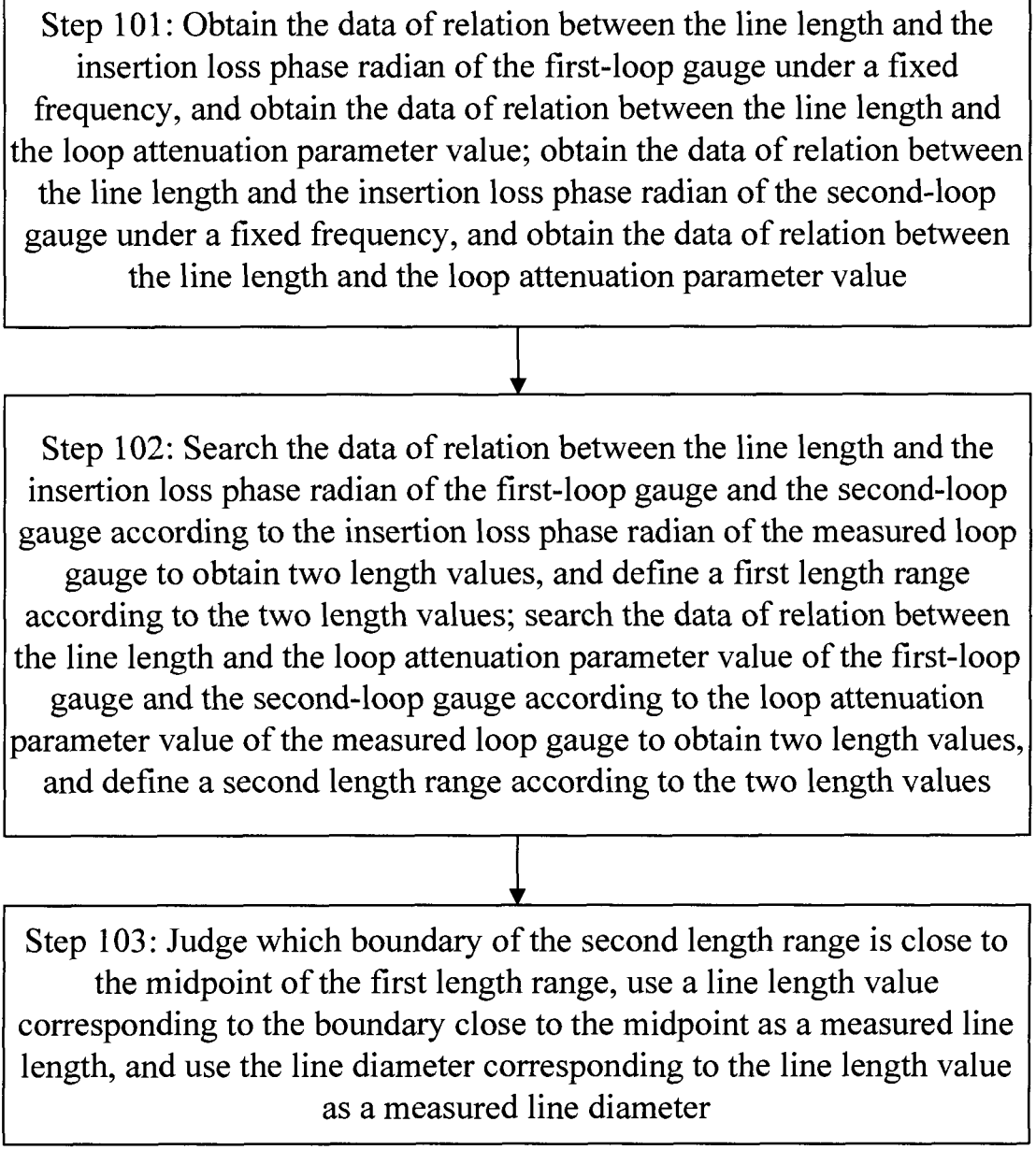
FIG. 1 is a flowchart of a measurement method provided in an embodiment of the present disclosure.

A line measurement method is provided in an embodiment of the present disclosure. As shown in FIG. 1, the method includes the following steps:

Step 101: The data of relation between the line length and the insertion loss [Hlin(f)] phase radian of the first-loop gauge under a fixed frequency and the data of relation between the line length and the loop attenuation parameter value are obtained. The data of relation between the line length and the Hlin(f) phase radian of the second-loop gauge under a fixed frequency and the data of relation between the line length and the loop attenuation parameter value are obtained.

Step 102: The data of relation between the line length and the Hlin(f) phase radian of the first-loop gauge and the second-loop gauge according to the Hlin(f) phase radian of the measured loop gauge is queried in order to obtain two length values, and a first length range is defined according to the two length values. The data of relation between the line length and the loop attenuation parameter value of the first-loop gauge and the second-loop gauge according to the loop attenuation parameter value of the measured loop gauge is queried in order to obtain two length values, and a second length range is defined according to the two length values.

Step 103: The boundary of the second length range close to the midpoint of the first length range is determined, a line length value corresponding to the boundary close to the midpoint is used as a measured line length, and the line diameter corresponding to the line length value is used as a measured line diameter.

The foregoing embodiment shows that the data of relation between the line length and the Hlin(f) phase radian, and data of relation between the line length and the loop attenuation parameter value of lines with various possible diameters are obtained beforehand. Afterward, the Hlin(f) phase radian and the loop attenuation parameter value are obtained according to the actual measured line, and the corresponding length values are obtained from the data of relation between the line length and the Hlin(f) phase radian and the data of relation between the line length and the loop attenuation parameter value of lines with various diameters, and the first length range and the second length range are obtained. As inferred from the related art, the first length range obtained from the data of relation between the phase radian and the line length of the first-loop gauge and the second-loop gauge is less than the second length range, and is more precise. The midpoint of the first length range serves as a basis of judgment, the line length value corresponding to the boundary of the second length range close to the midpoint serves as a measured line length, and the line diameter corresponding to this line length value serves as a measured line diameter. Therefore, both the line length and the line diameter of the measured line can be confirmed skillfully at the same time, and the measurement precision is improved, which facilitates the subsequent line maintenance and troubleshooting.

The line measurement method under the present disclosure is detailed below, taking a measured loop gauge of a twisted pair as an example, and taking the twisted pairs of the first line diameter (AWG #24) and the second line diameter (AWG #26) as examples.

FIG. 2 shows a line measurement method in an embodiment of the present disclosure. In this embodiment, the line length and the line diameter are calculated by using the Hlin (f) phase value and the loop attenuation (LATN) value in the test parameters. The method includes the following steps:

Step 201: The data of relation between the line length and the Hlin(f) phase radian of the first-loop gauge under a fixed frequency and the data of relation between the line length and the loop attenuation parameter value are obtained. The data of relation between the line length and the Hlin(f) phase radian of the second-loop gauge under a fixed frequency and the data of relation between the line length and the loop attenuation parameter value are obtained.

(1) The data of relation between the line length and the Hlin(f) phase radian of the first-loop gauge and the second-loop gauge is obtained under a fixed frequency.

As defined in ITU-T ADSL2 (G.992.3), Hlin(f) is a function that reflects transmission features of a channel. An equation between Hlin(f) and twisted pair feature parameters may be created by deducing the value of the RLCG (resistance, inductance, capacitance and conductance) model and the ABCD parameters of the twisted pair.

1. RLCG Model

The twisted pair is a type of transmission line. Any transmission line has basic parameters such as resistance (R), inductance (L), and conductance (G), and such parameters are called RLCG parameters. The RLCG model uses the RLCG parameters of a twisted pair to represent the channel features of the twisted pair. The RLCG model is also known as a primary model of the twisted pair channel because it provides only the RLCG parameters of the twisted pair channel rather than the transfer function of the twisted pair channel. As described below, the transfer function is deduced according to the RLCG parameters under the present disclosure.

The numeric RLCG model of twisted pairs (AWG #24 and #26) is obtained through measurement of the curve fitting of the cables, and is applicable to all bands, including the very high-speed digital subscriber line (VDSL) band. Equations 1-4 are general equations of the RLCG:

$$R(f) = \sqrt[4]{r_{oc}^4 + a_c f^2} \tag{1}$$

$$L(f) = l_0 + l_\infty (f/f_m)^b \tag{2}$$

$$G(f) = g_0 f^{g_e} \tag{3}$$

$$C(f) = c_\infty \tag{4}$$

The parameters involved in the equations are listed in Table 1.

TABLE 1

Parameters of numeric twisted pair model

| Parameter | AWG #24 | AWG #26 |
|---|---|---|
| $r_{oc}/(\Omega/km)$ | 174.55888 | 286.17578 |
| $a_c/(\Omega^4/km^4 Hz^2)$ | 0.053073481 | 0.14769620 |
| $l_0/(H/km)$ | 617.29593*10⁻⁶ | 675.36888*10⁻⁶ |
| $l_\infty/(H/km)$ | 478.97099*10⁻⁶ | 488.95186*10⁻⁶ |
| $f_m/(Hz)$ | 553760.63 | 806338.63 |
| b | 1.1529766 | 0.92930728 |
| $g_0$(Siemen/Hz*km) | 0.23487476*10⁻¹² | 4.3*10⁻⁸ |
| $g_e$ | 1.38 | 0.70 |
| $c_\infty$(nF/km) | 50*10⁻⁹ | 49*10⁻⁹ |

2. Transmission Constants and Characteristic Impedance of Transmission Lines

According to the foregoing transmission line RLCG parameters, two common parameters may be obtained: the transmission constant (λ) and the characteristic impedance ($Z_0(f)$), which can represent the voltage and the current along the transmission line. The transmission constant is:

$$\lambda = \alpha + j\beta = \sqrt{(R+j\omega L)(G+j\omega C)} \tag{5}$$

The definition of a propagation constant is based on two basic assumed scenarios: (1) jωC>>G; and (2) jωL>>R when f>100 KHz. The following equations 6 and 7 may be deduced according to equation 5:

$$\alpha = R\sqrt{\frac{C}{L}} = \alpha_0 f^{1/2} \tag{6}$$

$$\beta = \omega\sqrt{LC} = \beta_0 f \tag{7}$$

In the two equations above, $\alpha_0$ and $\beta_0$ are constants. According to the RLCG model of the transmission line, the characteristic impedance is defined as:

$$Z_0 = \sqrt{\frac{R + j\omega L}{G + j\omega C}} \tag{8}$$

3. ABCD Model of a 2-Port Network

The ABCD model uses a 2-port network to represent the features of a twisted pair channel. The ABCD model regards the twisted pair channel as a black box, and uses the input-output relation of the twisted pair channel to describe the characteristics of the twisted pair channel. This channel model is also known as a secondary model of the twisted pair channel. The ABCD parameters are generally obtained according to the RLCG parameters. According to the ABCD model of the channel, it is easy to calculate important parameters such as the transfer function, characteristic impedance, and input impedance of the twisted pair.

For an ordinary 2-port network, its ABCD parameters are illustrated in FIG. 3. The corresponding mathematic description is:

$$V_1 = AV_2 + BI_2 \tag{9}$$

$$I_1 = CV_2 + DI_2 \tag{10}$$

Figure 4:
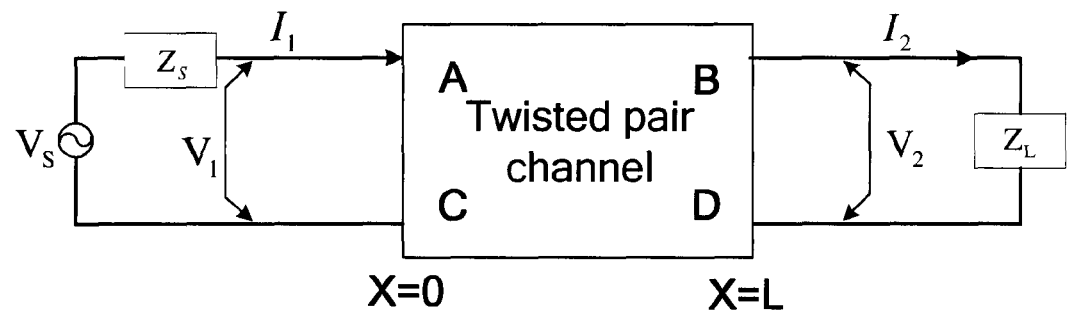
FIG. 4 shows a twisted pair transmission system in an embodiment of the present disclosure.

For the twisted pair transmission system shown in FIG. 4, its ABCD parameters may be proved as:

$$\begin{bmatrix} A & B \\ C & D \end{bmatrix} = \begin{bmatrix} \cos(\lambda L) & Z_0 \sinh(\lambda L) \\ \frac{\sinh(\lambda L)}{Z_0} & \cosh(\lambda L) \end{bmatrix} \tag{11}$$

If no loop ($Z_S$ is connected to $Z_L$ directly) exists, the voltage distributed onto the load is:

$$V_L = V_S \frac{Z_L}{Z_S + Z_L} \tag{12}$$

If a loop exists, voltage $V_1$ may be simplified as:

$$V_1 = AV_2 + BI_2 = V_S - I_1 Z_S \tag{13}$$

After $I_1$ is substituted into the equation above according to the second basic ABCD equation, the equation is:

$$V_1 = AV_2 + BI_2 = V_S - (CV_2 + DI_2)Z_S \tag{14}$$

After $I_2$ is replaced with $V_2/Z_L$ according to the ohm law, the equation is:

$$AV_2 + B\frac{V_2}{Z_L} = V_S - \left(CV_2 + D\frac{V_2}{Z_L}Z_S\right) \tag{15}$$

According the above equation, $V_2$ is:

$$V_2 = \frac{V_S Z_L}{AZ_L + B + Z_S(CZ_L + D)} \tag{16}$$

Therefore, Hlin(f) is:

$$Hlin(f) = \frac{V_2}{V_L} = \frac{Z_S + Z_L}{AZ_L + B + CZ_S Z_L + DZ_S} \tag{17}$$

4. Relation Between Hlin(f) Phase Radian and Line Length

After equation (11) is substituted into equation (17), the following may be obtained:

$$Hlin(f) = \frac{Z_L + Z_S}{\cosh(\lambda L)Z_L + Z_0 \sinh(\lambda L) + Z_S\left(\frac{\sinh(\lambda L)}{Z_0}Z_L + \cosh(\lambda L)\right)} \tag{18}$$

In FIG. 4, if the source impedance $Z_S$, the characteristic impedance $Z_0$, and the load impedance $Z_L$ match, and when $f \geq 100$ kHz, it is deemed that $Z_S = Z_L = Z_0$. Therefore, the above equation is simplified as:

$$Hlin(f) = \frac{1}{\cosh(\lambda L) + \sinh(\lambda L)} = e^{-\lambda L} \tag{19}$$

After equation (5) is substituted into the above equation, the following equation is obtained:

$$Hlin(f) = e^{-(\alpha + \beta j)L} \tag{20}$$

The following equation may be deduced from equation (20) and equation (7):

$$\angle Hlin(f) = -\beta L = -\beta_0 fL \tag{21}$$

Therefore, when f is known, a linear relation exists between the Hlin(f) phase radian and the line length.

Figure 5:
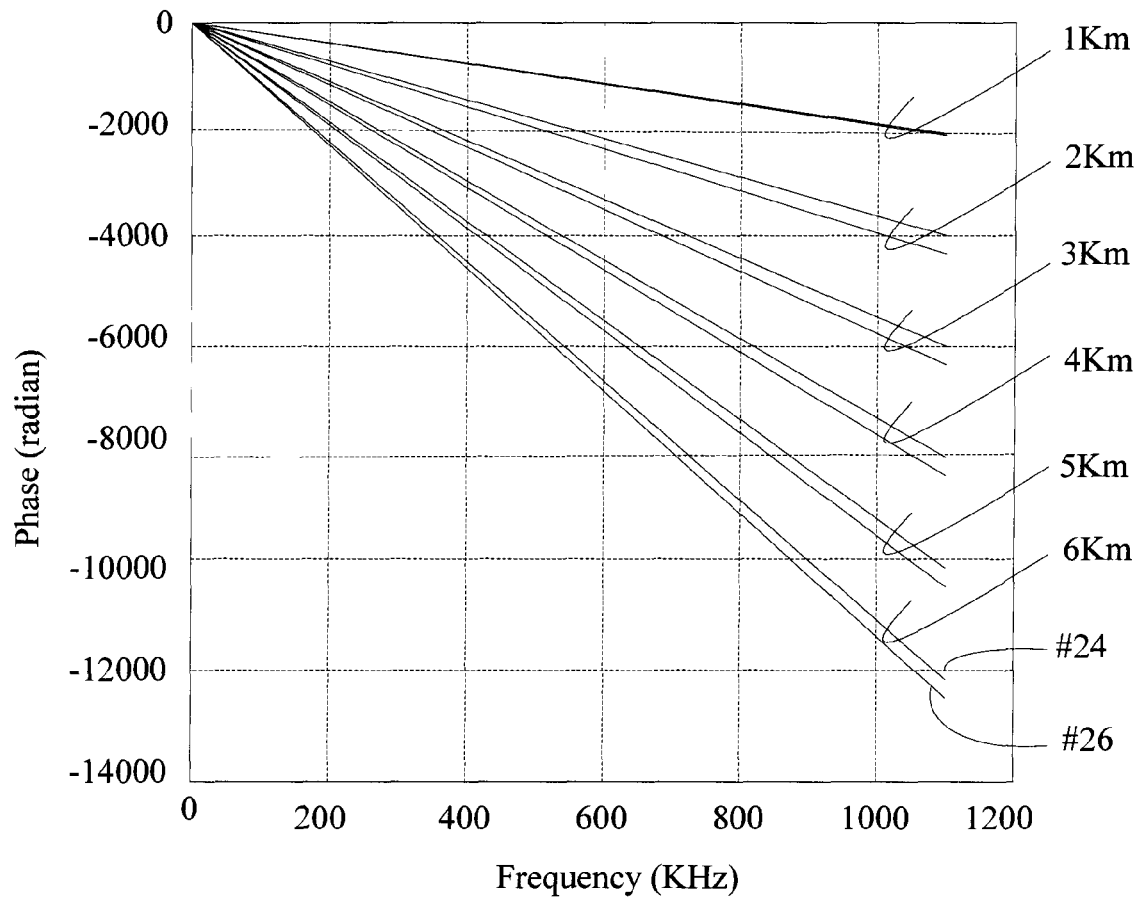
FIG. 5 shows the relation between Hlin(f) phase radian and frequency of AWG #24 and #26 lines in an embodiment of the present disclosure.

Based on the Hlin(f) equation 18 above, the relation between the Hlin(f) phase radian and the frequency of lines with different diameters (AWG #24 and #26) may be emulated on a computer, as shown in FIG. 5.

In FIG. 5, the Y axis represents phase radian, and the X axis represents frequency. The original value of the phase is an irregular curve that changes periodically with the increase of the frequency. In FIG. 5, the phase radian is spread. That is, at an interval of $2\pi$, the value in the next phase period is shifted so that the phase value of the next period is linked to that of the previous period. In this way, the phase radian takes on a straight line within the frequency range rather than an irregular curve which changes with the period. Such processing is helpful for observing and understanding the relation between the phase radian, the frequency, and the line length.

As shown in FIG. 5, the phase radian increases with the increase of the line length, and the difference between the radian of the AWG #24 cable and the radian of the AWG #26 cable under the same distance is very small.

Figure 6:
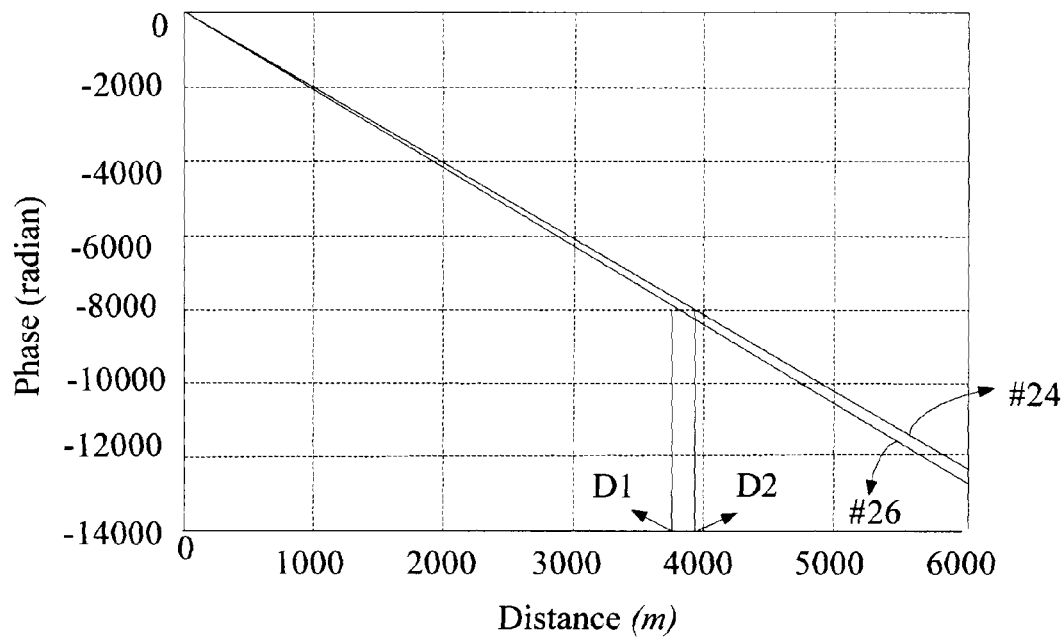
FIG. 6 shows the relation between line length and phase radian under the fixed frequency of 1104 KHz.

FIG. 6 shows the relation between line length and phase radian under the fixed frequency of 1104 KHz, where the Y axis represents phase radian and the X axis represents line length.

Taking the AWG #24 line and the AWG #26 line in FIG. 6 as examples, the ratio [K(1)] of the phase radian to the line length within the range defined by f=1104 KHz and L∈(1 km, 6 km) is calculated below:

$$K(l) = \angle(Hlin(f))/L \tag{22}$$

TABLE 2

Ratio of phase radian to line length

| | Distance L(m) | | | | | |
|---|---|---|---|---|---|---|
| | 1000 | 2000 | 3000 | 4000 | 5000 | 6000 |
| $K_{\#24}$ | −2.0347 | −2.0347 | −2.0347 | −2.0348 | −2.0348 | −2.0348 |
| $K_{\#26}$ | −2.1042 | −2.1043 | −2.1043 | −2.1043 | −2.1043 | −2.1043 |

Table 2 shows that the values of $K_{\#24}$ and $K_{\#26}$ are approximately constant, and their maximum fluctuation is approximately 0.005%. This error is negligible in the subsequent calculation. If the average value within L∈(1 km, 6 km) is used, the results are:

$$K_{\#24} = -2.03475$$

$$K_{\#26} = -2.1043$$

After the Hlin(f) value of the measured line is obtained, the length range $(D_1, D_2)$ of the AWG #26 and #24 lines is:

$$D_2 = \frac{\angle(Hlin)}{K_{\#24}} \quad (23)$$

$$D_1 = \frac{\angle(Hlin)}{K_{\#26}} \quad (24)$$

Therefore, an estimated line length value is:

$$\frac{D_1 + D_2}{2} \quad (25)$$

The difference between two lengths in the above length range is:

$$\Delta D = |D_2 - D_1| \quad (26)$$

After the values of $D_1, D_2$ are substituted into the above equation, the following is obtained:

$$\Delta D = \left| \angle(Hlin(f)) \left( \frac{1}{K_{\#24}} - \frac{1}{K_{\#26}} \right) \right| \quad (27)$$

When ∠Hlin(f)∈(0,−13000), the error between the result of equation 24 and the actual line length is:

$$E_{Hlin} = \pm \frac{\Delta D}{2D_2} \quad (28)$$

After equation 27 and equation 23 are substituted into the above equation, the error is 1.65%.

(2) The data of relation between the line length and the Hlin(f) phase radian of the first-loop gauge and the second-loop gauge is obtained under a fixed frequency.

As defined by the ITU-T ADSL2 (G.992.3) standard, the LATN is a parameter that reflects loop attenuation, and is a difference between the transmit power and the receive power (measured in dB). The LATN is defined below:

$$LATN(dB) = 10 * \log \frac{\sum_{i=0}^{NSC-1} |H(i * \Delta f)|^2}{NSC} \quad (29)$$

Figure 7:
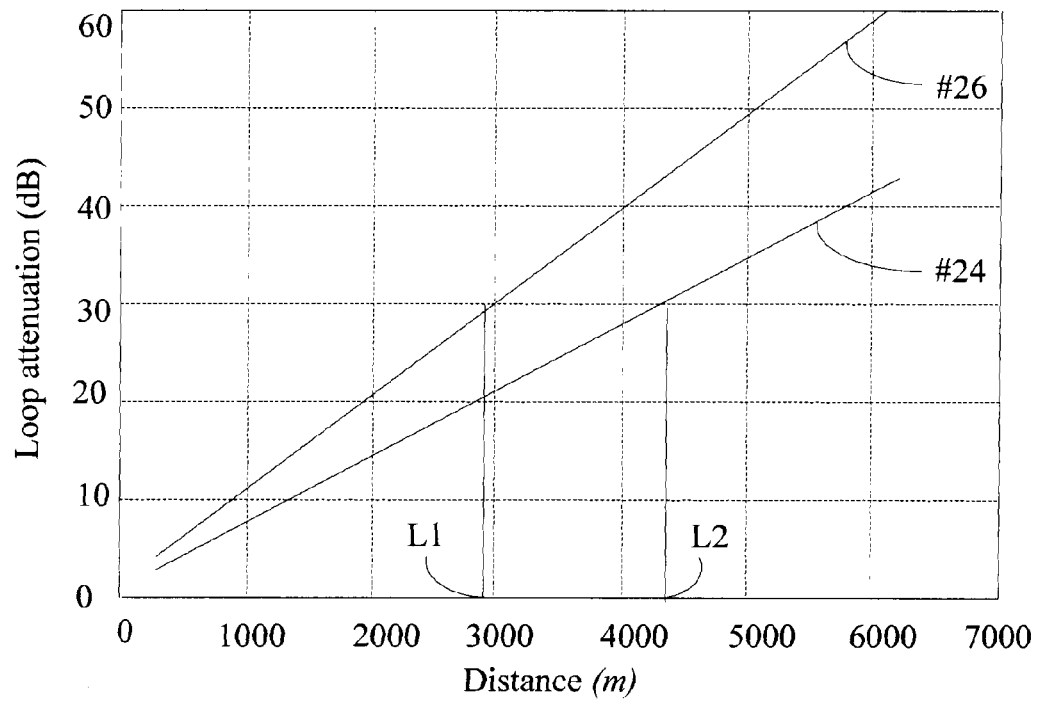
FIG. 7 shows the relation between line length and uplink LATN in an embodiment of the present disclosure.

FIG. 7 shows the relation between the line length and the uplink LATN, where the Y axis represents LATN and the X axis represents line length. In the straight line fitting, the value of LATN in the uplink direction is in a linear relation with the line length.

The ratio [M(1)] of LATN to line length is defined as:

$$M(l) = \frac{LATN(l)}{L} \quad (30)$$

Table 3 lists the values of M(1) calculated under different lengths according to equation 29.

TABLE 3

Ratio of uplink LATN to line length

| | Distance L(m) | | | | | |
|---|---|---|---|---|---|---|
| | 1000 | 2000 | 3000 | 4000 | 5000 | 6000 |
| $M_{\#24}$ | 0.0136 | 0.0124 | 0.0116 | 0.0110 | 0.0106 | 0.0103 |
| $M_{\#26}$ | 0.0171 | 0.0157 | 0.0148 | 0.0142 | 0.0138 | 0.0135 |

Table 3 shows that the maximum fluctuation of the M value is 8%. The error caused by such fluctuation is negligible in the subsequent calculation specific to different line diameters. The M value of the same line diameter changes slowly in the test interval, and is approximately constant. If the average of the M values is used, the results are:

$$M_{\#24} = 0.0116$$

$$M_{\#26} = 0.0148$$

If it is known that the measured line is either AWG #24 or #26, after the uplink LATN of the measured line is measured, the length range $(L_1, L_2)$ of the line can be deduced:

$$L_1 = \frac{LATN}{M_{\#26}} \quad (31)$$

$$L_2 = \frac{LATN}{M_{\#24}} \quad (32)$$

The difference between two lengths in the above length range is:

$$\Delta L = |L_2 - L_1| \quad (33)$$

After $L_1, L_2$ are substituted into the above equation, the following is obtained:

$$\Delta L = LATN * \left| \frac{1}{M_{\#24}} - \frac{1}{M_{\#26}} \right| \quad (34)$$

The error is:

$$E_{LATN} = \frac{\Delta L}{2L_2} \quad (35)$$

After equation 32 and equation 34 are substituted into equation 35, the error is 11.13%.

The measured loop attenuation parameter value of the first-loop gauge and the second-loop gauge may be an uplink loop attenuation parameter value obtained by measuring the first-loop gauge and the second-loop gauge, or a downlink loop attenuation parameter value obtained by measuring the first-loop gauge and the second-loop gauge. According to equation 21, the following is known:

$$\angle(Hlin) \propto D \quad (36)$$

According to equation 20, the following may be deduced:

$$|Hlin(f)|_{dB} = 20 \log|e^{-\gamma L}| = 20 \log|e^{-(\alpha+j\beta)L}|$$

Therefore, $$|Hlin(f)|_{dB} = (-20\alpha L)\log e$$

That is, $$|Hlin(f)|_{dB} \propto L \quad (37)$$

Equation 29 shows that the LATN value increases with the increase of D.

Equation 26 and equation 33 show that with respect to the value range of $\angle(Hlin)$ and LATN:

$$E_{LATN} >> E_{Hlin}$$

Therefore, $$\Delta L >> \Delta D \quad (38)$$

It is inferred that the fluctuation of $\angle(Hlin)$ as against line diameters (AWG #24 and #26) is far less than the fluctuation of LATN as against line diameters (AWG #24 and #26). It is understandable that the line length obtained from the data of relation between the phase radian and the line length involves a smaller error and is more precise.

Step 202: The data of relation between the line length and the Hlin(f) phase radian of the first-loop gauge and the second-loop gauge according to the Hlin(f) phase radian of the measured loop gauge is queried to obtain two length values, and a first length range is defined according to the two length values. The data of relation between the line length and the loop attenuation parameter value of the first-loop gauge and the second-loop gauge according to the loop attenuation parameter value of the measured loop gauge is queried to obtain two length values, and a second length range is defined according to the two length values, as detailed below:

Based on equation 18, a table is created to reflect the relation between line length and phase radian of the AWG #24 and #26 lines in the case of frequency f=1104 KHz. In the table, the line length may be 0-6 Km (or a variable according to the actual conditions), and 5 m is the minimum step. The minimum step of the line length determines the calculated minimum error of the line, and may vary as required. After the measured line Hlin(f) is obtained, its phase radian may be calculated. The length range $(D_1, D_2)$ of the AWG #26 and #24 lines may be found through a table lookup. In this embodiment, this length range is called the first length range.

Based on equation 29, a table is created to reflect the relation between the line length and the uplink/downlink LATN value of the AWG #24 and #26 lines. The line length in the table is generally 0-6 Km, and 5 m is the minimum step. The minimum step of the line length determines the calculated minimum error of the line, and may vary as required. After the uplink LATN of the measured line is obtained, the length range $(L_1, L_2)$ of the AWG #24 and #26 lines may be found through table lookup. In this embodiment, this length range is called the second length range.

In this way, a smaller first length range $(D_1, D_2)$ of the line is determined first according to the $\angle(Hlin)$ information, and then a larger second length range of the line $(L_1, L_2)$ is determined according to the LATN.

Step 203: The boundary of the second length range close to the midpoint of the first length range is determined, a line length value corresponding to the boundary close to the midpoint is used as a measured line length, and the line diameter corresponding to the line length value is used as a measured line diameter, as detailed below:

$$\left|\frac{D_1 + D_2}{2} - L_1\right|$$

is compared with $$\left|\frac{D_1 + D_2}{2} - L_2\right|.$$

If $$\left|\frac{D_1 + D_2}{2} - L_1\right|$$

is greater than $$\left|\frac{D_1 + D_2}{2} - L_2\right|,$$

it is indicated that the line length is closer to the boundary of the second length range $(L_2)$, and therefore, the line diameter is determined as AWG #24. If $$\left|\frac{D_1 + D_2}{2} - L_1\right|$$

is smaller than $$\left|\frac{D_1 + D_2}{2} - L_2\right|,$$

it is indicated that the line length is closer to the boundary of the first length range $(L_1)$, and therefore, the line diameter is determined as AWG #26. This method may be used to determine a single line diameter.

The fluctuation of $\angle(Hlin)$ as against line diameters (AWG #24 and #26) is far less than the fluctuation of the LATN as against line diameters (AWG #24 and #26) if the line length is the same. Therefore, either the length $D_1$ or the length $D_2$ determined by $\angle(Hlin)$ is generally selected according to the line diameter determined in step 203, so that a more precise line length may be obtained.

A line measurement method is provided in another embodiment of the present disclosure. As shown in FIG. 8, the method includes the following steps:

Step 801: The data of relation between the line length and the Hlin(f) phase radian of the first-loop gauge under a fixed frequency, and the data of relation between the line length and the loop attenuation parameter value are obtained. The data of relation between the line length and the Hlin(f) phase radian of the second-loop gauge under a fixed frequency and the data of relation between the line length and the loop attenuation parameter value are obtained.

Step 802: The data of relation between the line length and the Hlin(f) phase radian of the first-loop gauge and the second-loop gauge according to the Hlin(f) phase radian of the measured loop gauge is queried to obtain two length values, and a first length range is defined according to the two length values. The data of relation between the line length and the loop attenuation parameter value of the first-loop gauge and the second-loop gauge according to the loop attenuation parameter value of the measured loop gauge is queried to obtain two length values. A second length range and a third length range are defined by using the two length values as midpoints respectively, and a remaining length range between the second length range and the third length range is defined as a fourth length range. The second length range and the third length range correspond to the first-loop gauge and the second-loop gauge respectively, and the fourth length range corresponds to a hybrid line composed of the first-loop gauge and the second-loop gauge.

Step 803: If the midpoint of the first length range belongs to the second or third length range, the line diameter corresponding to the second or third length range is determined as the measured line diameter. If the midpoint of the first length range belongs to the fourth length range, the hybrid line diameter corresponding to the fourth length range is determined as the measured line diameter.

A method for measuring a hybrid line is provided in an exemplary embodiment. In practice, a measured line may be spliced from the lines with two or more line diameters. Therefore, as against the measured line with only one line diameter, it is necessary to provide multiple length intervals of possible line lengths. FIG. 9 shows a hybrid line interval, where the measured line is a spliced subscriber line that involves two line diameters. The range determined by $L_1$, $L_2$ may be divided into three intervals.

Therefore, a standard error may be calculated according to equation 28 and the test error (e %):

$$E\% = E_{Hlin}\% + e\%$$

A judgment range is estimated:
(1) Judgment interval of AWG #26:

$$[L_1-(L_2-L_1)*E\%, L_1+(L_2-L_1)*E\%] \quad (39)$$

(2) Judgment interval of AWG #24:

$$[L_2-(L_2-L_1)*E\%, L_2+(L_2-L_1)*E\%] \quad (40)$$

(3) Judgment interval of a hybrid line:

$$[L_1+(L_2-L_1)*E\%, L_2-(L_2-L_1)*E\%] \quad (41)$$

The line diameter and the line length are determined according to the interval that covers $$\frac{D_1+D_2}{2}.$$

An equation that involves Hlin may be created according to the RLCG parameters of the line diameter. According to steps 801-803, the line length and the line diameter are calculated, and a judgment is made about whether the line diameter is a hybrid line diameter.

FIG. 10 shows a line measurement method in another embodiment of the present disclosure. In this embodiment, the line length and the line diameter are calculated by using the uplink value and the downlink value of the LATN in the test parameters. The method includes the following steps:

Based on equation 29, the fluctuation of the LATN in the uplink direction of a loop gauge is different from the fluctuation of the LATN in the downlink direction of the same loop gauge. Therefore, the length and the diameter of a line can be calculated after the uplink LATN value and the downlink LATN value of the line are measured.

Step 1001: The data of relation between the line length and the uplink loop attenuation parameter value of the first-loop gauge and the data of relation between the line length and the downlink loop attenuation parameter value of the first-loop gauge are obtained. The data of relation between the line length and the uplink loop attenuation parameter value of the second-loop gauge and the data of relation between the line length and the downlink loop attenuation parameter value of the second-loop gauge are obtained.

Based on equation 29, a table is created to reflect the relation between the line length and the uplink/downlink LATN value of the AWG #24 and #26 lines. The line length in the table is generally 0-6 Km, and 5 m is the minimum step. The minimum step of the line length determines the calculated minimum error of the line, and may vary as required.

Step 1002: The first length value and the second length value, respectively from the data of relation between the line length and the uplink loop attenuation parameter value of the first-loop gauge and the second-loop gauge are obtained according to the loop attenuation parameter value of the measured loop gauge; the third length value and the fourth length value, respectively from the data of relation between the line length and the downlink loop attenuation parameter value of the first-loop gauge and the second-loop gauge are obtained according to the loop attenuation parameter value of the measured loop gauge.

After the uplink LATN and the downlink LATN of the measured line are obtained, the lengths ($D_1$, $D_2$) of the AWG #26 and #24 lines may be found through a table lookup. After the downlink LATN of the measured line are obtained, the lengths ($D_4$, $D_3$) of the AWG #26 and #24 lines may be found through a table lookup.

Step 1003: After an absolute value of the difference between the first length value and the third length value and an absolute value of the difference between the second length value and the fourth length value are obtained, the two absolute values are compared, and the diameter and the length of the line corresponding to the length values with a smaller absolute value of difference are used as the measured line diameter and the measured length.

The absolute value $|D_1-D_4|$ is compared with the absolute value $|D_2-D_3|$. The diameter and the length corresponding to the smaller absolute value are the diameter and the length of the actual line.

In an exemplary embodiment, only one parameter value may be measured so that the measurement is easier.

Figure 11:
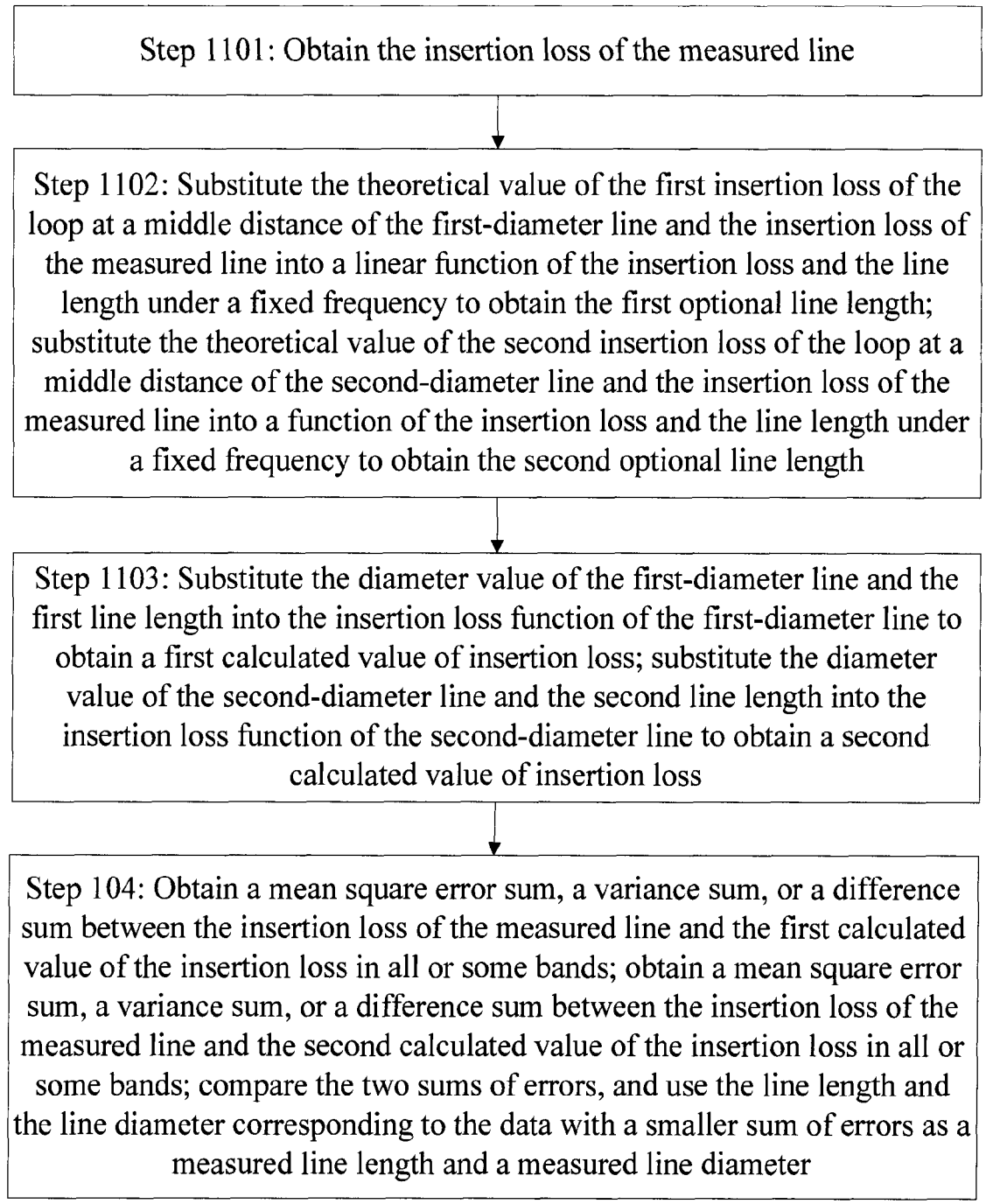
FIG. 11 is a flowchart of a line measurement method provided in an embodiment of the present disclosure.

As shown in FIG. 11, a line measurement method is provided in another embodiment of the present disclosure. In this embodiment, the line length and the line diameter are calculated by using the H log(f) value in the test parameters. The method includes the following steps:

Step 1101: The logarithmic value H $\log_{test}$ of the insertion loss of the measured line is obtained.

Step 1102: The theoretical logarithmic value H $\log_{ref\,24}$ of the first insertion loss of the loop at a middle distance of the first-loop gauge and the logarithmic value H $\log_{test}$ of the insertion loss of the measured line are substituted into a linear function of the logarithmic value H $\log_{(f)}$ of the insertion loss and the line length under a fixed frequency to obtain an optional line length $L_{test\,24}$. The theoretical logarithmic value H $\log_{ref\,26}$ of the second insertion loss of the loop at a middle distance of the second-loop gauge and H $\log_{test}$ of the measured line are substituted into a linear function of H $\log_{(f)}$ and the line length under a fixed frequency to obtain an optional line length $L_{test\,26}$.

Equation 37 $|Hlin(f)|_{dB} \infty L$ shows that: When frequency f>100 KHz, an approximate linear relation exists between the H log(f) and the line length L under the same frequency:

$$\frac{H\log(f)_1}{H\log(f)_2} = \frac{L_1}{L_2} \qquad (42)$$

First, the H $\log_{test}$ parameter of the line is obtained. Then theoretical values of H $\log_{ref\,24}$ and H $\log_{ref\,26}$ of the loop at a middle distance (for example, 2 km) of the AWG #24 line and #26 line are selected as a reference loop, and the following equations are obtained on the basis of equation 42:

$$L_{test24} = L_{ref} \times \frac{H\log_{test}}{H\log_{ref24}} \qquad (43)$$

$$L_{test26} = L_{ref} \times \frac{H\log_{test}}{H\log_{ref26}} \qquad (44)$$

The measured H $\log_{test}$ parameter is substituted into equation 43 and equation 44 to obtain length values $L_{test24}$ and $L_{test26}$ under two different line diameters.

Step 1103: The diameter value of the first-loop gauge and the line length $L_{test24}$ are substituted into the insertion loss function Hlin(f) of the first-loop gauge, and a logarithmic operation is performed to obtain H $\log_{test24}$. The diameter value of the second-loop gauge and the line length $L_{test24}$ are substituted into the insertion loss function Hlin(f) of the second-loop gauge, and then a logarithmic operation is performed to obtain H $\log_{test\,26}$.

The following variance sums is obtained in all bands:

$$error_{24} = \sum_{i=1}^{N} \||H\log_{test}(f_i)| - |H\log_{test24}(f_i)|\|^2 \qquad (45)$$

$$error_{26} = \sum_{i=1}^{N} \||H\log_{test}(f_i)| - |H\log_{test26}(f_i)|\|^2 \qquad (46)$$

Step 1104: A sum of mean square errors, a variance sum, or a difference sum of H $\log_{test}$ and H $\log_{test\,24}$ is obtained in all bands or some bands. A sum of mean square errors, a variance sum, or a difference sum of H $\log_{test}$ and H $\log_{test\,26}$ is obtained in all bands or some bands. The error sums of the foregoing data are compared, and the line length and the line diameter corresponding to the data with a smaller error sum are used as the measured line length and the measured line diameter.

For example, $error_{24}$ is compared with $error_{26}$, and the line diameter and the line length corresponding to the smaller error are the diameter and the length of the actual line.

In other embodiments, it is not necessary to adopt the logarithmic form of the insertion loss function, but adopt the insertion loss function value itself for calculation. In this way, the linear function of the logarithmic value H log(f) of the insertion loss and the line length is changed to the function of the logarithmic value H log(f) of the insertion loss and the line length.

It is understandable to those skilled in the art that all or part of the steps of the line measurement method in the foregoing embodiments may be implemented in hardware instructed by program code. The program may be stored in a computer-readable storage medium. When being executed, the program may include the contents of all the foregoing embodiments of the method under the present disclosure. The storage medium may be a Read-Only Memory/Random Access Memory (ROM/RAM), a magnetic disk, a compact disk, etc.

Figure 12:
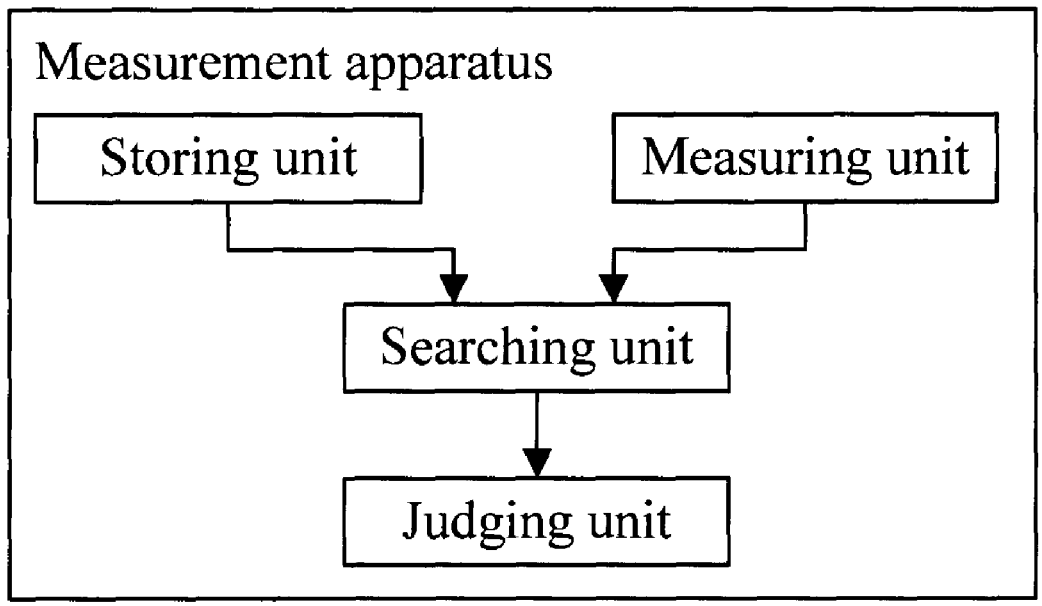
FIG. 12 is a schematic diagram of a measurement apparatus provided in an embodiment of the present disclosure.

A measurement apparatus is also provided in an embodiment of the present disclosure. As shown in FIG. 12, the measurement apparatus includes:

a storing unit configured to store the data of relation between the line length and the Hlin(f) phase radian of the first-loop gauge under a fixed frequency, and store the data of relation between the line length and the loop attenuation parameter value; store the data of relation between the line length and the Hlin(f) phase radian of the second-loop gauge under a fixed frequency, and store the data of relation between the line length and the loop attenuation parameter value;

a measuring unit configured to obtain the Hlin(f) phase radian and the loop attenuation parameter value of the measured loop gauge;

a searching unit configured to search the data of relation between the line length and the Hlin(f) phase radian of the first-loop gauge and the second-loop gauge according to the Hlin(f) phase radian of the measured loop gauge to obtain two length values, and define a first length range according to the two length values; search the data of relation between the line length and the loop attenuation parameter value of the first-loop gauge and the second-loop gauge according to the loop attenuation parameter value of the measured loop gauge to obtain two length values, and define a second length range according to the two length values; and a determining unit configured to determine the boundary of the second length range close to the midpoint of the first length range, use a line length value corresponding to the boundary close to the midpoint as a measured line length, and use the line diameter corresponding to the line length value as a measured line diameter.

In the foregoing embodiment, the data of relation between the line length and the Hlin(f) phase radian, and the data of relation between the line length and the loop attenuation parameter value of lines with various possible diameters are obtained beforehand. Afterward, the Hlin(f) phase radian and the loop attenuation parameter value are obtained according to the actual measured line, and the corresponding length values are obtained from the data of relation between the line length and the Hlin(f) phase radian and the data of relation between the line length and the loop attenuation parameter value of lines with various diameters, and the first length range and the second length range are obtained. As inferred from the related art, the first length range obtained from the data of relation between the phase radian and the line length of the first-loop gauge and the second-loop gauge is less than the second length range, and is more precise. The midpoint of the first length range serves as a basis of judgment, the line length value corresponding to the boundary of the second length range close to the midpoint serves as a measured line length, and the line diameter corresponding to this line length value serves as a measured line diameter. Therefore, both the line length and the line diameter of the measured line can be confirmed skillfully at the same time, and the measurement precision is improved, which facilitates the subsequent line maintenance and troubleshooting.

Figure 13:
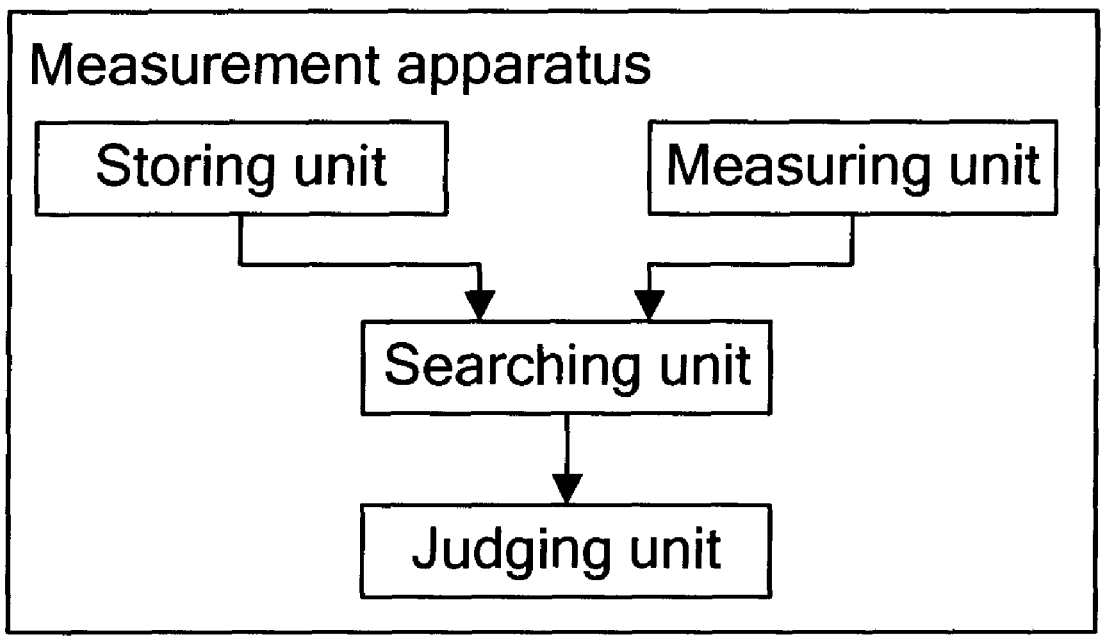
FIG. 13 is a schematic diagram of a measurement apparatus provided in an embodiment of the present disclosure.

A measurement apparatus is also provided in an embodiment of the present disclosure. As shown in FIG. 13, the measurement apparatus includes:

a storing unit configured to store the data of relation between the line length and the uplink loop attenuation parameter value of the first-loop gauge, and store the data of relation between the line length and the downlink loop attenuation parameter value of the first-loop gauge; store the data of relation between the line length and the uplink loop attenuation parameter value of the second-loop gauge, and store the data of relation between the line length and the downlink loop attenuation parameter value of the second-loop gauge;

a measuring unit configured to obtain the loop attenuation parameter value of the measured loop gauge;

a searching unit configured to obtain the first length value and the second length value, respectively from the data of relation between the line length and the uplink loop attenuation parameter value of the first-loop gauge and the second-loop gauge according to the loop attenuation parameter value of the measured loop gauge; and obtain the third length value and the fourth length value respectively, from the data of relation between the line length and the downlink loop attenuation parameter value of the first-loop gauge and the second-loop gauge according to the loop attenuation parameter value of the measured loop gauge; and a determining unit configured to obtain an absolute value of difference between the first length value and the third length value and obtain an absolute value of difference between the second length value and the fourth length value, compare the two absolute values, and use the diameter and the length of the line corresponding to the length values with a smaller absolute value of difference as the measured line diameter and the measured length.

The storing unit, the measuring unit, the searching unit, and the determining unit of the measurement apparatus may be integrated in one processing module. By analogy, all the units in the measurement apparatus may also be integrated in one processing module; or any two or more units in the foregoing embodiments may be integrated into one processing module.

A measurement apparatus is also provided in an embodiment of the present disclosure. The measurement apparatus includes:

an obtaining unit configured to obtain data of relation between the line length and the insertion loss phase radian of the first-loop gauge and the second-loop gauge under a fixed frequency, and obtain data of relation between the line length and the loop attenuation parameter value;

a searching unit configured to search the data of relation between the line length and the insertion loss phase radian of the first-loop gauge and the second-loop gauge according to the insertion loss phase radian of the measured loop gauge to obtain two length values, and define a first length range according to the two length values; search the data of relation between the line length and the loop attenuation parameter value of the first-loop gauge and the second-loop gauge according to the loop attenuation parameter value of the measured loop gauge to obtain two length values, define a second length range and a third length range by using the two length values as midpoints respectively, and define the remaining length range between the second length range and the third length range as a fourth length range, where the second length range and the third length range correspond to the first-loop gauge and the second-loop gauge respectively, and the fourth length range corresponds to a hybrid line composed of the first-loop gauge and the second-loop gauge; and a determining unit configured to determine the line diameter corresponding to the second length range to be the first line diameter measured when the midpoint of the first length range belongs to the second length range and when the midpoint of the first length range belongs to the third length range, determine the line diameter corresponding to the third length range to be the second line diameter measured; when the midpoint of the first length range belongs to the fourth length range, determine the hybrid line diameter corresponding to the fourth length range to be the measured line diameter.

A measurement apparatus is also provided in an embodiment of the present disclosure. The measurement apparatus includes:

an insertion loss obtaining unit configured to obtain the insertion loss of the measured line;

a calculating unit configured to substitute the theoretical values of the first insertion loss and the second insertion loss of a loop at a middle distance of the first-loop gauge and the second-loop gauge, as well as the insertion loss of the measured line, into a function of the insertion loss and the line length under a fixed frequency to obtain the first optional line length and the second optional line length; and, substitute the line diameter values and the length values of the first-loop gauge and the second-loop gauge into the insertion loss function of the first-loop gauge and the second-loop gauge to obtain the first calculated value of insertion loss and the second calculated value of insertion loss; and a determining unit, configured to obtain a sum of errors between the insertion loss of the measured line and the first calculated value of insertion loss in all or some bands; obtain a sum of errors between the insertion loss of the measured line and the second calculated value of insertion loss in all or some bands; compare the two sums of errors, and use the line length and the line diameter corresponding to the data with a smaller sum of errors as the measured line length and the measured line diameter.

The units of the measurement apparatus in the embodiments of the present disclosure may be implemented through hardware, or, if applicable, through software function modules. Accordingly, the embodiments of the present disclosure may be sold or used as a stand-alone product, and, if applicable, may be stored in a computer-readable storage medium for sale or use.

Embodiments consistent with the present disclosure may provide at least the following benefits:

(1) The line length and line diameter may be determined concurrently within the testable range of the DELT, and the testable length range is wide. Generally, for an AWG #26 line, the length range testable by the DELT is 0-6000 m.

(2) The precision of calculating the length and determining the diameter is high. Because the line diameter is determined first, and then the line length is determined according to the features of the line diameter, the precision is high.

(3) A judgment can be made about whether the line is a hybrid line.

(4) The application scope is wide. The DELT parameters Hlin, H log, and LATN, or any combination thereof may serve as the line measurement parameters.

Detailed above are a line measurement method and a measurement apparatus provided in the embodiments the present disclosure. Although the disclosure has been described through some exemplary embodiments, the disclosure is not limited to such embodiments. It is apparent that those skilled in the art can make various modifications and variations to the disclosure without departing from the scope of the disclosure.

What is claimed is:

1. A line measurement method, comprising the following steps performed by a line measurement device:

respectively obtaining data of relation between a line length and an insertion loss phase radian of a first-loop gauge and a second-loop gauge under a fixed frequency, and data of relation between the line length and a loop attenuation parameter value;

defining a first length range according to two length values obtained by searching the data of relation between the line length and the insertion loss phase radian of the first-loop gauge and the second-loop gauge according to the insertion loss phase radian of a measured loop gauge; and defining a second length range according to two length values obtained by searching the data of relation between the line length and the loop attenuation parameter value of the first-loop gauge and the second-loop gauge according to the loop attenuation parameter value of the measured loop gauge; and determining a boundary of the second length range which is close to a midpoint of the first length range, using a line length value corresponding to the boundary close to the midpoint as a measured line length, and using a line diameter corresponding to the line length value as a measured line diameter.

2. The method according to claim 1, wherein the measured loop attenuation parameter value of the first-loop gauge and the second-loop gauge is an uplink or downlink loop attenuation parameter value obtained by measuring the first-loop gauge and the second-loop gauge.

3. The method according to the method 1, wherein using the line length value corresponding to the boundary close to the midpoint as the measured line length refers to:

determining the boundary of the second length range close to the midpoint, selecting the boundary of the first length range close to the determined boundary of the second length range, and using the line length value corresponding to the selected boundary of the first length range as the measured line length.

4. A line measurement method, comprising the following steps performed by a line measurement device:

respectively obtaining data of relation between a line length and an insertion loss phase radian of a first-loop gauge and a second-loop gauge under a fixed frequency, and data of relation between the line length and a loop attenuation parameter value;

defining a first length range according to the two length values obtained by searching the data of relation between the line length and the insertion loss phase radian of the first-loop gauge and the second-loop gauge according to the insertion loss phase radian of a measured loop gauge; defining a second length range and a third length range by using two length values obtained by searching the data of relation between the line length and the loop attenuation parameter value of the first-loop gauge and the second-loop gauge according to the loop attenuation parameter value of the measured loop gauge as midpoints respectively, and defining a remaining length range between the second length range and the third length range as a fourth length range, wherein the second length range and the third length range correspond to the first-loop gauge and the second-loop gauge respectively, and the fourth length range corresponds to a hybrid line composed of the first-loop gauge and the second-loop gauge; and when a midpoint of the first length range belongs to the second length range, determining a line diameter corresponding to the second length range to be a first line diameter measured; when the midpoint of the first length range belongs to the third length range, determining the line diameter corresponding to the third length range to be the second line diameter measured; when the midpoint of the first length range belongs to the fourth length range, determining a hybrid line diameter corresponding to the fourth length range to be a measured line diameter.

5. A line measurement method, comprising the following steps performed by a line measurement device:

obtaining data of relation between a line length and an uplink loop attenuation parameter value of a first-loop gauge and a second-loop gauge respectively, and data of relation between the line length and a downlink loop attenuation parameter value of the first-loop gauge and the second-loop gauge respectively;

obtaining a first length value and a second length value, respectively from the data of relation between the line length and the uplink loop attenuation parameter value of the first-loop gauge and the second-loop gauge according to a loop attenuation parameter value of a measured loop gauge; and a third length value and a fourth length value, respectively from the data of relation between the line length and the downlink loop attenuation parameter value of the first-loop gauge and the second-loop gauge according to the loop attenuation parameter value of the measured loop gauge; and obtaining a first absolute value of a difference between the first length value and the third length value, and a second absolute value of a difference between the second length value and the fourth length value, comparing the first and second absolute values, and using a diameter and a length of the line corresponding to the length values with a smaller absolute value of difference as a measured line diameter and a measured length.

6. A line measurement method, comprising the following steps performed by a line measurement device:

obtaining an insertion loss of a measured line;

substituting theoretical values of a first insertion loss and a second insertion loss of a loop at a middle distance of a first-loop gauge and a second-loop gauge, as well as an insertion loss of the measured line, into a function of insertion loss and line length under a fixed frequency to obtain a first optional line length and a second optional line length;

substituting a line diameter value and a length value of the first-loop gauge and the second-loop gauge into an insertion loss function of the first-loop gauge and the second-loop gauge to obtain a first calculated value of the insertion loss and a second calculated value of the insertion loss; and obtaining a sum of errors between the insertion loss of the measured line and the first calculated value of the insertion loss in all or some bands; and a sum of errors between the insertion loss of the measured line and the second calculated value of the insertion loss in all or some bands; comparing the two sums of errors, and using the line length and a line diameter corresponding to the data with a smaller sum of errors as a measured line length and a measured line diameter.

7. The method according to claim 6, wherein the sum of errors is a sum of mean square errors, a variance sum, or a difference sum.

8. A measurement apparatus, comprising:
- a storing unit configured to store data of relation between a line length and an insertion loss phase radian of a first-loop gauge under a fixed frequency, and store data of relation between the line length and a loop attenuation parameter value; store data of relation between a line length and an insertion loss phase radian of a second-loop gauge under a fixed frequency, and store the data of relation between the line length and the loop attenuation parameter value;
- a measuring unit configured to obtain an insertion loss phase radian and a loop attenuation parameter value of a measured loop gauge;
- a searching unit configured to define a first length range according to two length values obtained by searching the data of relation between the line length and the insertion loss phase radian of the first-loop gauge and the second-loop gauge according to the insertion loss phase radian of the measured loop gauge; and define a second length range according to two length values by searching the data of relation between the line length and the loop attenuation parameter value of the first-loop gauge and the second-loop gauge according to the loop attenuation parameter value of the measured loop gauge; and
- a determining unit configured to determine the boundary of the second length range close to a midpoint of the first length range, use a line length value corresponding to the boundary close to the midpoint as a measured line length, and use a line diameter corresponding to the line length value as a measured line diameter.

* * * * *